United States Patent [19]

Shah et al.

[11] Patent Number: 5,533,037
[45] Date of Patent: Jul. 2, 1996

[54] LATENCY ERROR DETECTION CIRCUIT FOR A MEASUREMENT SYSTEM

[75] Inventors: Jaffar Shah; Kosta Ilic; Joseph E. Peck; Zu-Yi Wang, all of Travis County, Tex.

[73] Assignee: National Instruments Corporation, Austin, Tex.

[21] Appl. No.: 248,417

[22] Filed: May 24, 1994

[51] Int. Cl.⁶ .................................................. G06F 11/00
[52] U.S. Cl. .................. 371/62; 371/61; 364/260.8; 364/DIG. 1
[58] Field of Search .................. 371/62, 61, 60, 371/57.1, 48; 364/265, 260.8

[56] References Cited

U.S. PATENT DOCUMENTS

| | | | |
|---|---|---|---|
| 3,701,096 | 10/1972 | Hunter et al. | 371/57.1 |
| 3,805,040 | 4/1974 | Boden et al. | 371/60 |
| 4,763,296 | 8/1988 | Gerakei | 371/62 |
| 4,918,696 | 4/1990 | Pordham et al. | 371/57.1 |
| 4,972,414 | 11/1990 | Borkenhagen et al. | 371/22.3 |
| 5,228,129 | 7/1993 | Bryant et al. | 395/325 |

*Primary Examiner*—Robert W. Beausoliel, Jr.
*Assistant Examiner*—Albert Décady
*Attorney, Agent, or Firm*—Jeffrey C. Hood

[57] ABSTRACT

A latency error detection circuit including two cascaded latches receiving a clock signal from a measuring system upon the occurrence of an event and correspondingly asserting a bit to a processing system, and a circuit for clearing the first latch after the processing system acknowledges detecting the bit being asserted. If the second latch is clocked before the first latch is cleared, the second latch sets an error bit indicating a latency error condition. The processor system monitors the error bit to determine whether a latency error has occurred.

9 Claims, 3 Drawing Sheets

LATENCY ERROR DETECTION CIRCUIT FOR A MEASUREMENT SYSTEM

FIELD OF THE INVENTION

The present invention relates to detecting latency errors in a measurement system, and more particularly, to a detection circuit for determining whether a processing system has processed information or responded to an event in time.

DESCRIPTION OF THE RELATED ART

Scientists and engineers often use measurement systems to perform a variety of functions, including laboratory research, process monitoring and control, data logging, analytical chemistry, test and analysis of physical phenomena and control of mechanical or electrical machinery, to name a few examples. One example of hardware to implement such measuring systems is a data acquisition (DAQ) system, which typically includes transducers for measuring and providing electrical signals, signal conditioning such as amplification, isolation and filtering, and DAQ hardware for receiving digital and analog signals and providing them to a processing system, such as a personal computer. The computer may further include analysis hardware and software for analyzing and appropriately displaying the measured data. Other hardware I/O (input/output) interface options include the GPIB (general purpose interface bus), the VXI-bus, and the RS-232 protocol.

A measurement system typically includes an I/O board plugged into one of the I/O slots of the processing or computer system. Generally, the processing system is an IBM AT or other IBM compatible computer system having an I/O bus and connectors or slots for receiving I/O boards. Of course, other computer systems and I/O buses may be used. The I/O board typically includes memory, such as a buffer or register, for temporarily storing data values to be provided to the computer. When retrieving data, the measurement system I/O board often stores only one data value, so that it overwrites the previous data value as soon as a new data value is available. The computer includes a CPU (central processing unit), which retrieves the data value from the register by executing one or more read cycles on the I/O bus to access the stored data value in the I/O board memory. Thus, the CPU must operate at least as fast as the measurement system by retrieving data as fast or faster than stored by the measurement system, since otherwise data loss occurs. This is true even if the I/O memory implements a first-in-first-out (FIFO) queue, since the memory will eventually overflow. The CPU must operate even faster if the data to be retrieved has more bits than the data width of the I/O bus of the computer, so that the CPU must execute multiple cycles to retrieve the data. For example, using a computer having a 16-bit I/O bus, 24-bit data values stored in a 32-bit register would require a first cycle to read the first 16 bits and a second cycle to retrieve the remaining 8 bits. If the CPU is unable to retrieve the data values at the same rate as the measurement system stores them, the previous data value is overwritten after the first data cycle but before the second, so that the computer retrieves erroneous data.

Often, the processing system is performing other tasks in addition to retrieving and processing data from a DAQ system. For instance, the processing system usually must program the DAQ system to perform certain tasks or take certain measurements. Also, the DAQ system may need to be configured one way to perform a first task, such as reading data or detecting events occurring at one rate, and then configured in a different way to perform a second task, such as reading data or detecting events occurring at a different rate. Thus, the processing system may have to perform other processing tasks before the DAQ system can initiate a different task. However, the process or parameters being measured or controlled are often asynchronous, so that the processing system may or may not complete these other tasks in time. In general, since it is not always possible to determine the amount of time available between two separate events, the processing system may respond to the second event too late.

In prior measurement systems, the designer was required to take some type of precaution to assure valid data or that the processing system responded in time. Otherwise, there was a substantial risk of losing data or missing the occurrence of an event without notice. Thus, in many measurement systems, new data was lost or an event went undetected.

It is desirable to provide a method and apparatus of communication between processing and measurement systems so that the processing system can determine whether it has retrieved data or otherwise responded to the occurrence of an event in time.

SUMMARY OF THE INVENTION

A latency error detection circuit according to the present invention preferably includes two cascaded latches, both receiving an event signal from a measurement system after detecting the occurrence of an event, and logic responsive to a processing system for clearing the first latch by asserting an acknowledge signal. The first latch sets a data ready bit when the measurement system asserts an event signal and clears the data ready bit when the acknowledge signal is asserted. The second latch receives the data ready bit and sets an error bit if the event signal is asserted before the data ready bit is cleared. Thus, the error bit indicates a latency error, where a new event has occurred before the processing system properly acknowledged the first event. Preferably, a gate is provided to keep the error bit asserted until the measurement system clears the error bit. In this manner, the processing system monitors the error bit to determine if a latency error has occurred.

In the preferred embodiment, the latency error detection circuit is provided on a DAQ board plugged into an I/O slot of a computer system, where the DAQ board includes DAQ conversion logic to assert the event signals. The DAQ board preferably includes I/O logic to respond to I/O cycles on the I/O bus, such as to provide data or respond to an acknowledge signal or cycles executed by the processing system. The DAQ conversion logic asserts an event signal to clock the first and second latches, which are preferably D type flip-flops, and the first latch sets the data ready bit. The data ready bit causes the DAQ I/O logic to provide an interrupt to an interrupt controller of the computer. Alternatively, the CPU is implemented to poll the DAQ periodically, rather than being interrupted. The interrupt controller responds by interrupting the CPU, which executes an ISR (interrupt service routine) to determine the source and otherwise handle the interrupt. The processing system then performs various processing or initialization tasks in preparation of another event. Such tasks include reprogramming the DAQ system to take new measurements, or executing cycles to retrieve data from the DAQ. After the CPU performs these other tasks or operations, it executes an acknowledge cycle to the DAQ I/O logic, which asserts an acknowledge signal to reset the first latch.

If the DAQ system receives and writes another data value or otherwise detects the occurrence of another event before the CPU acknowledges the first event, the second latch is clocked and consequently sets the error bit indicating a latency error. The CPU executes a cycle to read status bits including the error bit to determine whether a latency error has occurred. If the error bit is set, the CPU takes whatever action is desired to handle the latency error, if any, and then executes a reset cycle to clear the error bit. The I/O logic responds to the reset cycle and asserts a signal to clear the error bit.

In an alternative embodiment, the DAQ conversion logic asserts two or more separate event signals, to clock respective two or more latches. Thus, a latency error occurs if a second event signal is asserted after the first event signal but before the acknowledge signal clears the first latch. This embodiment provides more flexibility in detecting a latency error between two separate events.

Therefore, a latency error detection circuit according to the present invention sets an error bit to inform a processing system whether a latency error has occurred. The processing system may then take any appropriate action.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
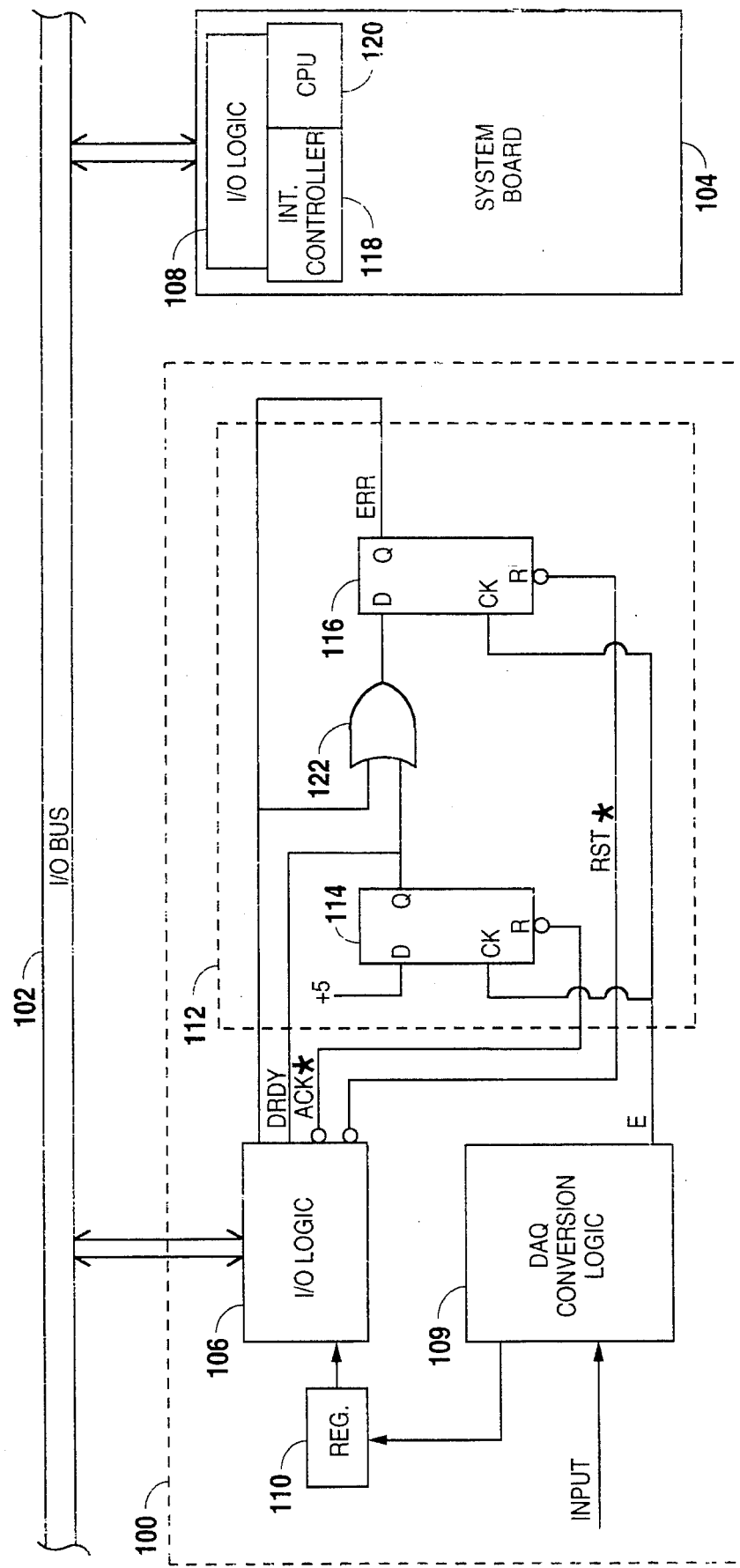
FIG. 1 is a block and schematic diagram of a computer connected to a data acquisition system incorporating a latency error detection circuit according to the present invention.

Referring now to FIG. 1, a data acquisition (DAQ) system board 100 including a latency error detection circuit 112 is shown coupled to the input output (I/O) bus 102 of a computer system C, which could be any type of computer system, such as an IBM XT, AT or IBM compatible computer, for example. It is understood that the present invention is not limited to DAQ systems, but could be used in other data measurement, control or monitoring systems using other hardware I/O interface options, such as the GPIB (general purpose interface bus), the VXIbus, or the RS-232 protocol, to name a few examples. The I/O bus 102 could be any type of I/O bus structure. A system board 104 of the computer system C is shown coupled to the I/O bus 102. The DAQ board 100 includes I/O logic 106 for communicating to the system board 104 across the I/O bus 102. Likewise, the system board 104 includes I/O logic 108 for executing cycles on the I/O bus 102 for communicating with the DAQ board 100.

The DAQ board 100 preferably includes DAQ conversion logic 109, which is coupled to signal conditioning circuitry (not shown), which receives electrical signals from transducers (not shown) measuring physical phenomena and converting measured parameters into proportional electrical signals. The signal conditioning circuitry provides corresponding electrical signals, referred to collectively as INPUT signals, to the DAQ conversion logic 109. The DAQ conversion logic 109 preferably includes appropriate measurement logic such as counters or timers for timing or otherwise converting the INPUT signals into a digital data value, and logic for storing each data value in a memory element 110. The memory 110 is preferably a 32-bit register although other sizes and types of memory elements are contemplated, such as buffers, random access memory (RAM), etc. In the preferred embodiment, the INPUT signals are altered or otherwise asserted in response to physical phenomena, thereby causing an event. In an alternate embodiment, the INPUT signals are asserted in response to other occurrences, such as completion of a task by the DAQ board. Such events occur asynchronously in real time, and although a certain minimum time is usually specified between events, the time between events is usually unknown.

The latency error detection circuit 112 according to the present invention is preferably part of the DAQ board 100, although it could be implemented as a separate component, if desired. The DAQ conversion logic 109 asserts an event clock signal, referred to as E, in response to an event indicated on the INPUT signals, or after a data value has been converted and written to the register 110, for example. The E signal is provided to the clock inputs of a first D-type flip-flop 114 and a second D-type flip-flop 116. The D input of the D flip-flop 114 preferably receives a logic high value, which is preferably a 5 volt signal, although any other voltage level representing a logic one value is acceptable. Thus, each time the E signal is asserted, the D flip-flop 114 sets a data ready signal or bit, referred to as DRDY, which is provided to the I/O logic 106 of the DAQ board 100. The DRDY bit thus represents the occurrence of an event detected by the DAQ conversion logic 109. Correspondingly, the I/O logic 106 asserts a corresponding interrupt signal on the I/O bus 102, which is detected by an interrupt controller 118 provided within the system board 104. The interrupt controller 118 preferably interrupts or otherwise informs a CPU 120 of the system board 104 that an interrupt has occurred and indicates the source of the interrupt. As known to those skilled in the art, the system board 104 executes an ISR (interrupt service routine), which determines the source of the interrupt and responds accordingly. Thus, the CPU 120 determines the source of the interrupt from the interrupt controller 118 and performs any desired operations to respond to the interrupt initiated by the DRDY bit. For example, the CPU 120 may execute cycles on the I/O bus 102 to read data from the register 110, or to otherwise initiate the DAQ board 100 to perform other measurement or control operations.

It is understood that although an interrupt system described above is preferred, other acceptable methods of communication between the DAQ board 100 and the system board 104 could be implemented. For example, the CPU 120 could execute cycles to poll the DAQ board 100 periodically to determine if the DRDY bit is set. Also, as noted above, it is understood that an event is not necessarily indicative of retrieving and storing data, but could also indicate other events such as the completion of a task by the DAQ board 100. In that case the CPU 120 may have to complete other tasks, such as reprogramming the DAQ board 100, for example, to begin measuring or controlling other physical phenomena. However, the physical phenomena often asserts events asynchronously before the CPU 120 completes reprogramming, causing a latency error.

The DRDY bit is also provided to one input of an OR gate 122, which has its output connected to the D input of the D flip-flop 116. The Q output of the D flip-flop 116 provides a signal or bit, referred to as ERR, to the I/O logic 106 and to the other input of the OR gate 122. The D flip-flop 114 includes an inverted reset input receiving an inverted acknowledge signal ACK* from the I/O logic 106. An asterisk (*) following a signal name denotes negative logic, where the signal is considered negated when high and asserted when low. Otherwise, signals conform to positive logic, where the signal is consider negated when low and asserted when high. The D flip-flop 116 also includes an inverted reset input receiving an error reset signal RST* from the I/O logic 106.

Operation of the latency error detection circuit 112 is as follows. The DAQ conversion logic 109 detects changes or otherwise measures the INPUT signals, writes a corresponding data value into the register 110 while also asserting a pulse on the E signal. The D flip-flop 114 sets the DRDY bit in response, which causes the OR gate 122 to assert its output high. Although the D flip-flop 116 is also clocked, it clocks a zero before the output of the OR gate 122 is asserted high, so that the ERR bit remains cleared. The I/O logic 106 detects the DRDY bit asserted by the D flip-flop 114, and asserts an interrupt on the I/O bus 102 in response. The CPU 120 responds by determining the source of the interrupt and performing any desired tasks in response. For example, the CPU 120 may execute a cycle to read the data from the register 110, or may perform other tasks and functions in preparation of taking new or further measurements. Eventually, the CPU 120 executes an acknowledge cycle to the I/O logic 106 after it has completed its desired task to acknowledge the occurrence of the event. In response to the acknowledge cycle, the I/O logic 106 correspondingly asserts a pulse on the ACK* signal to the D flip-flop 114. If the ACK* signal is asserted before the next pulse of the E signal, then the D flip-flop 114 is cleared before the D flip-flop 116 is clocked. Thus, if the ACK* signal is asserted to clear the D flip-flop 114 before the E signal is subsequently asserted again, the output of the OR gate 122 is pulled low so that the ERR bit is not set.

If another event is detected by the DAQ conversion logic 109 before the CPU 120 executes the acknowledge cycle, then the E signal is asserted while the DRDY bit is set and while the output of the OR gate is asserted high. If so, the D flip-flop 116 is clocked, thereby setting the ERR bit indicating a latency error. The CPU 120 eventually executes a cycle on the I/O bus 102 to retrieve status bits including the ERR bit. If the ERR bit is asserted, the CPU 120 is thereby informed that a latency error has occurred. Once this has been determined, the CPU 120 executes a reset cycle on the I/O bus 102 causing the I/O logic 106 to assert the RST* signal, which causes the D flip-flop 116 to clear the ERR bit. It is noted that because of the operation of the OR gate 122, the ERR bit remains asserted regardless of subsequent assertions of the ACK* signal, until the RST* signal is asserted.

Figure 2:
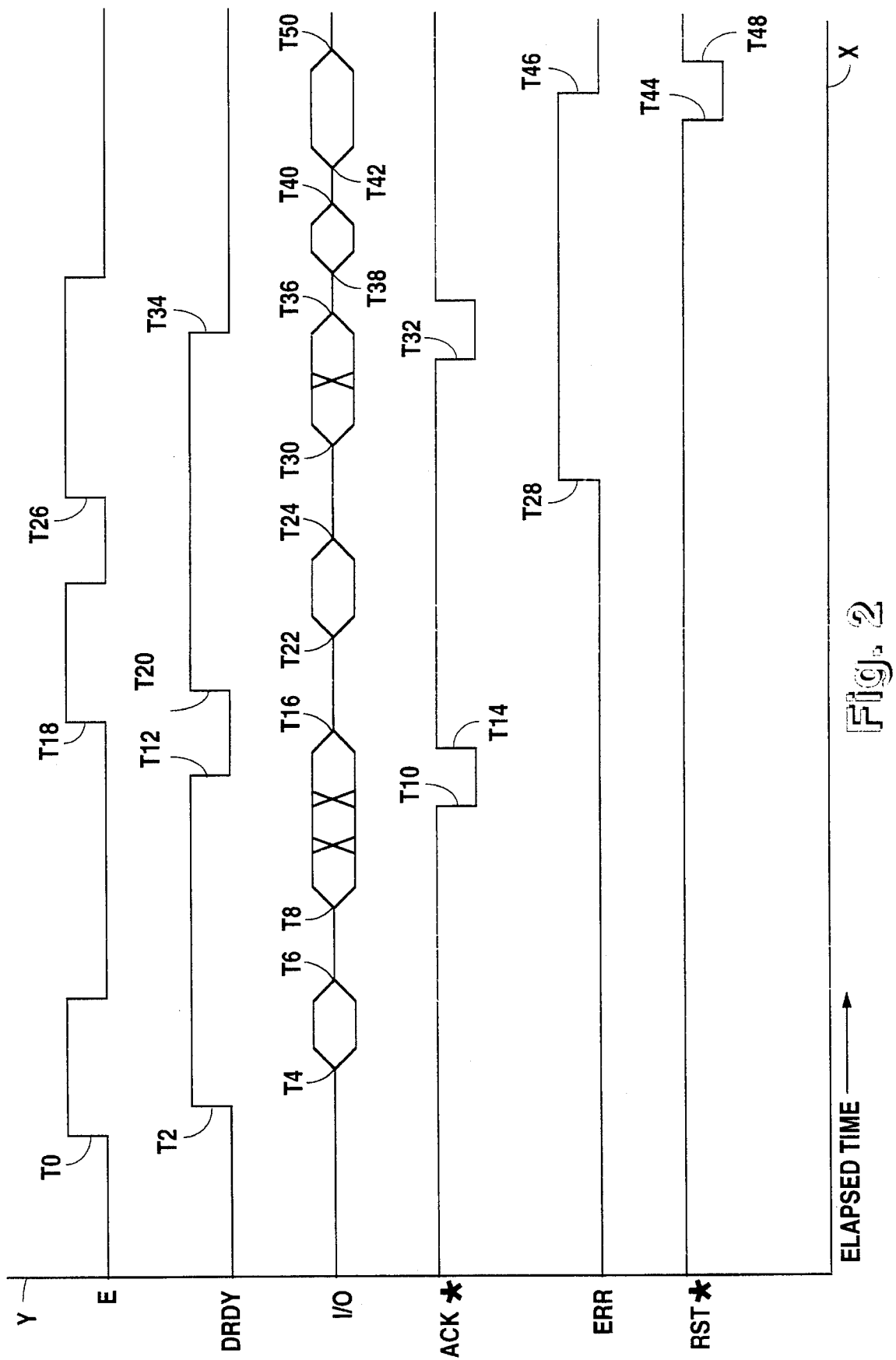
FIG. 2 is a timing diagram illustrating operation of the latency error detection circuit of FIG. 1.

Referring now to FIG. 2, a timing diagram is shown more clearly illustrating operation of the error detection circuit 112. Elapsed time is indicated along an X axis and the E, ACK*, and RST* signals, the DRDY and ERR bits and an I/O signal are shown along a Y axis. The I/O signal indicates cycles executing on the I/0 bus 102. At a time T0, the DAQ conversion logic 109 asserts the E signal to clock the D flip-flop 114, which correspondingly sets the DRDY bit at a time T2. This causes a corresponding interrupt signal to be asserted on the I/O bus 102 (not shown) which is detected by the interrupt controller 118 of the system board 104. An ISR routine is executed to inform the CPU 120 of the interrupt. The CPU 120 correspondingly performs other tasks or functions to properly respond to the interrupt, such as executing a read cycle on the I/O bus 102 beginning at a time T4 to read data from the register 110, which is completed at a time T6. Alternatively, the cycle occurring between times T4 and T6 could be any other desired task or function, such as an operation to reprogram the DAQ board 100 to perform another measuring task, for example, since the cycle is not an acknowledge cycle, the ACK* signal remains negated high.

Subsequently at a time T8, the CPU 120 executes an acknowledge cycle on the I/O bus 102 to write status bits to the I/O logic 106, including a bit corresponding to the ACK* signal. The I/O logic 106 correspondingly pulses the ACK* signal low at a time T10 and high at a time T14 to clear the D flip-flop 114. The D flip-flop 114 clears the DRDY bit at a time T12 and the cycle on the I/O bus completes at a time T16. The CPU 120 may execute other cycles after time T16 to read status bits from the I/O logic 106, including the ERR bit. Since the ERR bit is cleared, a latency error has not occurred.

Subsequently, at a time T18, the DAQ conversion logic 109 again asserts a pulse on the E signal after another, subsequent event has been detected or after a new data has been written to the register 110, where the E pulse clocks the D flip-flops 114, 116, thereby setting the DRDY bit at a time T20. However, since the D flip-flop 114 has been cleared, the D flip-flop 116 latches a zero so that the ERR bit remains cleared. Eventually, the CPU 120 responds to the DRDY bit by performing desired tasks or executing a cycle between times T22 and T24 as described previously. However, the CPU 120 has not completed all of its tasks, and thus does not perform an acknowledge cycle to assert the ACK* signal. At a subsequent time T26, the DAQ conversion logic 109 detects another event or writes a new data value into the register 110 and asserts the E signal high. Since the DRDY bit is asserted at time T26, the output of the OR gate 122 is also asserted high, so that the D flip-flop 116 sets the ERR bit at a time T28 indicating that a latency error has occurred. Subsequently, at a time T30, the CPU 120 executes a cycle on the I/O bus 102 to perform an acknowledge cycle to the I/O logic 106. Although the CPU 120 causes the ACK* signal to be asserted at a time T32, thereby clearing the D flip-flop 114 and the DRDY bit at time T34, the OR gate 122 assures that the ERR bit remains asserted. The acknowledge cycle is completed at a time T36. The CPU 120 subsequently begins a read cycle at a time T38 to read the ERR bit. Since the ERR bit is asserted, the CPU 120 detects that a latency error has occurred. This read cycle completes at a time T40.

Eventually, the CPU 120 executes a reset cycle on the I/O bus 102 beginning at a time T42 to cause the I/O logic 106 to assert the RST* signal to clear the D flip-flop 116 and the ERR bit. The RST* signal is asserted low at a time T44, thereby clearing the D flip-flop 116, which clears the ERR bit at a time T46 in response. It is understood that other forms of acknowledgement are contemplated, such as the CPU 120 asserting a clear signal on the I/O bus 102 or directly to the I/O logic 106.

Figure 3:
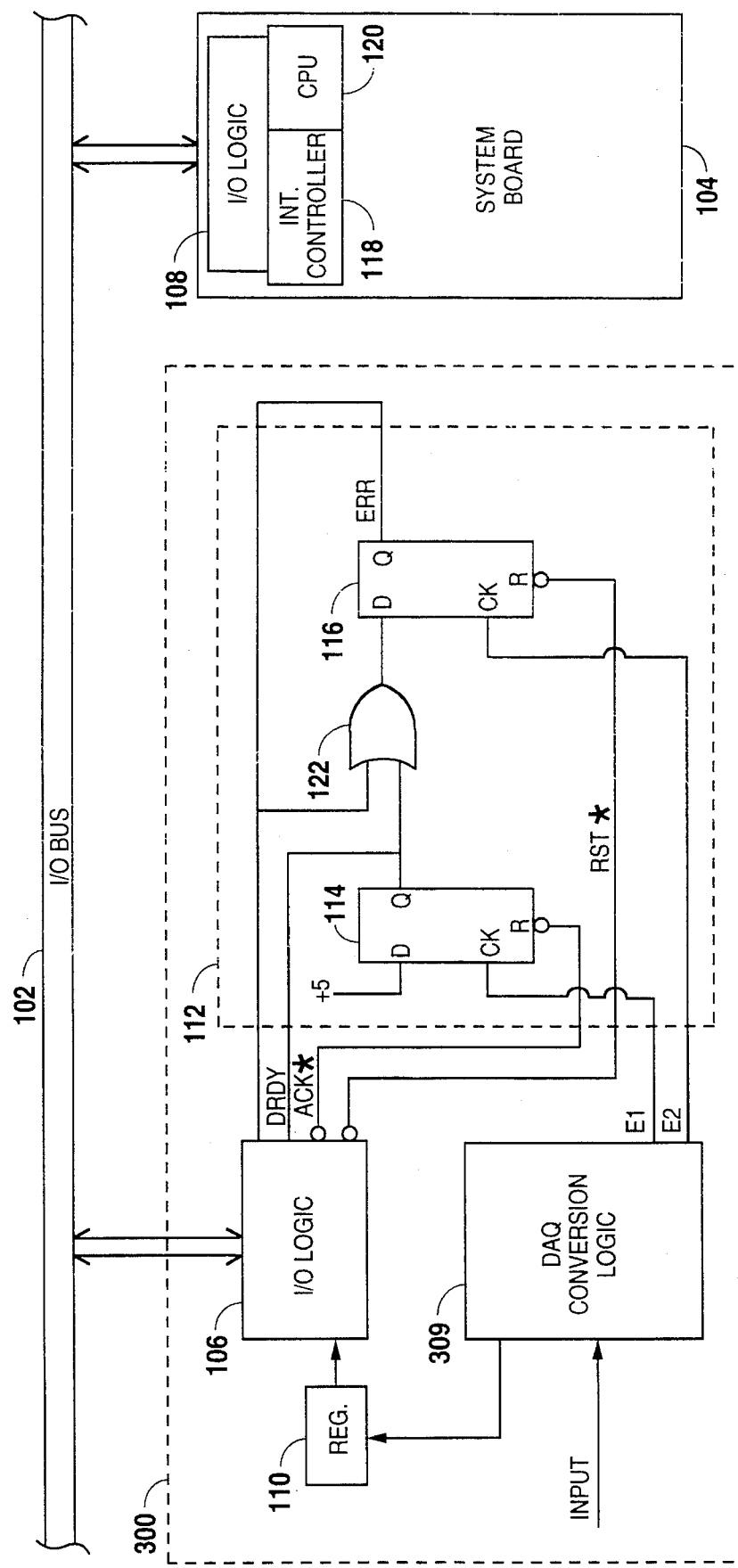
FIG. 3 is a block and schematic diagram of an alternative embodiment of a latency error detection circuit according to the present invention.

Referring now to FIG. 3, a block and schematic diagram of an alternative embodiment of a latency error detection circuit according to the present invention is shown. The circuit of FIG. 3 is very similar to FIG. 1, where similar elements have identical reference numerals. A DAQ board 300 replaces the DAQ board 100, where the DAQ board 300 is similar to the DAQ board 100, except that the DAQ conversion logic 109 is replaced with another DAQ conversion logic 309. The DAQ conversion logic 309 operates in a similar manner as the DAQ conversion logic 109, except that it provides a first event signal E1 to the clock input of the D flip-flop 114, and a second event signal E2 to the D flip-flop 116. In this manner, the event signal E1 is asserted in response to one event and the E2 signal is asserted in response to another or even a different event. This dual event signal capability provides more flexibility in detecting latency errors between two events or between different types of events. In this case, the ERR bit is set indicating a latency error if the E2 signal is asserted after the E1 signal is asserted, but before the ACK* signal is asserted. However, the ERR bit is not set if the ACK* signal clears the DRDY bit before the E2 signal is asserted. Again, the ERR bit is cleared by asserting the RST* signal.

It can now be appreciated that a latency error detection circuit according to the present invention provides a way for a processing system to detect a latency error in a measurement or data retrieval system. A first latch sets a data ready bit after receiving a clock signal from a measurement system indicating a first event has occurred. The data ready bit directly or indirectly informs the processing system that a first event has occurred. The processing system performs any desired functions in response to the first event, such as retrieving data from a DAQ board, and then causes an acknowledge signal to be asserted to clear the data ready bit. If the processing system delays too long before acknowledging the first event such that a second event occurs in the interim, a second latch clocks the data ready bit to set an error bit indicating a latency error. The processing system detects the latency error bit and responds as desired. The processing system then causes a reset signal to be asserted to clear the error bit.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A measurement system which detects latency errors in received data, comprising:

data acquisition conversion logic which receives input data signals indicating events of physical phenomena, wherein said input data signals occur asynchronously to said data acquisition conversion logic, wherein the data acquisition conversion logic generates one or more event signals in response to receiving an input data signal;

a memory coupled to said data acquisition conversion logic for storing said received input data signals;

processing logic coupled to said memory which performs operations in response to a stored input data signal, wherein said processing logic generates an acknowledge cycle after completing said operations performed in response to said stored input data signal;

acknowledge logic coupled to said processing logic, wherein said acknowledge logic receives said acknowledge cycle from said processing logic, wherein said acknowledge logic asserts an acknowledge signal in response to said processing logic completing said operations performed in response to said stored input data signal;

a first latch coupled to said data acquisition conversion logic and receiving said at least one of said one or more event signals generated by said data acquisition conversion logic, wherein said first latch asserts a data ready signal in response to receiving said at least one of said one or more event signals generated by said data acquisition conversion logic, wherein said asserted data ready signal indicates that an input data signal has been received, wherein said first latch includes a reset input receiving said acknowledge signal from said acknowledge logic for clearing said data ready signal when said acknowledge signal is asserted; and a second latch coupled to said first latch and receiving said data ready signal and receiving at least one of said one or more event signals generated by said data acquisition conversion logic, wherein said second latch generates an error signal if said data ready signal is asserted while said at least one of said one or more event signals is asserted.

2. The measurement system of claim 1, wherein said first latch and said second latch receive the same event signal.

3. The measurement system of claim 1, wherein said first latch receives said event signal at a first clock input, and said second latch receives said event signal at a second clock input.

4. The measurement system of claim 1, further comprising: a gate receiving said data ready signal and said error signal and having an output coupled to an input of said second latch, wherein said second latch asserts said error signal if either said error signal or said data ready signal is asserted when said event signal is asserted.

5. The measurement system of claim 1, wherein the acknowledge logic asserts a reset signal in response to the processing logic indicating clearing said error bit, wherein said second latch further includes a reset input receiving said reset signal for clearing said error bit when the reset signal is asserted.

6. The measurement system of claim 1, wherein said first and second latches comprise flip-flops.

7. A measurement system, comprising:

a bus;

data acquisition logic, comprising:

a memory for storing a data value;

data acquisition conversion logic coupled to said memory, wherein said data acquisition conversion logic receives input data signals indicating events of physical phenomena and stores said input data signals in said memory, wherein said data acquisition logic asserts an event signal in response to an input data signal being received;

input/output logic coupled to said memory and to said bus, wherein said input/output logic includes:

logic for asserting an interrupt signal on said bus in response to said data acquisition conversion logic receiving an input data signal;

logic for providing said data value stored in said memory onto said bus in response to a read cycle executed on said bus;

logic for asserting an acknowledge signal in response to an acknowledge cycle executed on said bus; and a latency error detection circuit, comprising:

a first latch coupled to said data acquisition logic receiving said event signal generated by said data acquisition conversion logic, wherein said first latch sets a data ready bit when said event signal is asserted, wherein said first latch also asserts a data ready signal in response to said event signal being asserted, wherein said asserted data ready signal indicates that an input data signal has been received, wherein said first latch includes a reset input receiving said acknowledge signal from said input/output logic for clearing said data ready bit in response to said acknowledge signal being asserted, and for clearing said data ready signal when said acknowledge signal is asserted;

a second latch coupled to said first latch and said data acquisition logic and receiving said event signal generated by said data acquisition conversion logic, wherein said second latch asserts an error signal if said data ready signal is asserted when said event signal is asserted; and a processing system coupled to said bus for executing cycles on said bus, said cycles including a read cycle to retrieve said data value from said memory and an acknowledge cycle to acknowledge receiving said data value from said memory.

8. The measurement system of claim 7, wherein said latency error detection circuit further comprises:

a gate receiving said data ready signal and said error signal and having an output coupled to an input of said second latch, wherein said second latch asserts said error signal if either said error signal or said data ready signal is asserted when said event signal is asserted.

9. The measurement system of claim 7, wherein said second latch includes a reset input for clearing said error signal, wherein said input/output logic includes means for asserting a reset signal provided to said reset input of said second latch in response to a reset cycle on said bus, and wherein said processing system executes said reset cycle on said bus to clear said error signal.

* * * * *